(12) United States Patent
Kopparapu et al.

(10) Patent No.: US 8,756,064 B2
(45) Date of Patent: Jun. 17, 2014

(54) METHOD AND SYSTEM FOR CREATING FRUGAL SPEECH CORPUS USING INTERNET RESOURCES AND CONVENTIONAL SPEECH CORPUS

(75) Inventors: SunilKumar Kopparapu, Mumbai (IN); Imran Ahmed Sheikh, Mumbai (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 73 days.

(21) Appl. No.: 13/533,174

(22) Filed: Jun. 26, 2012

(65) Prior Publication Data

US 2013/0030810 A1 Jan. 31, 2013

(30) Foreign Application Priority Data

Jul. 28, 2011 (IN) .......................... 2148/MUM/2011

(51) Int. Cl.
*G10L 13/00* (2006.01)

(52) U.S. Cl.
USPC .......................................................... 704/260

(58) Field of Classification Search
USPC .......................................................... 704/260
See application file for complete search history.

(56) References Cited

U.S. PATENT DOCUMENTS

| 6,430,551 | B1 | 8/2002 | Thelen et al. |
| 7,406,408 | B1 * | 7/2008 | Lackey et al. ...................... 704/8 |
| 7,516,070 | B2 * | 4/2009 | Kahn ............................ 704/235 |
| 7,640,158 | B2 * | 12/2009 | Detlef et al. ................... 704/235 |
| 7,668,718 | B2 * | 2/2010 | Kahn et al. .................... 704/270 |
| 7,693,717 | B2 * | 4/2010 | Kahn et al. .................... 704/260 |
| 2003/0191625 | A1 * | 10/2003 | Gorin et al. ....................... 704/1 |
| 2003/0200094 | A1 | 10/2003 | Gupta |
| 2009/0024555 | A1 * | 1/2009 | Rieck et al. ...................... 706/54 |
| 2009/0276233 | A1 * | 11/2009 | Brimhall et al. .................. 705/1 |

OTHER PUBLICATIONS

Gwénolé Lecorvé, Guillaume Gravier and Pascale Sébillot "On the Use of Web Resources and Natural Language Processing Techniques to Improve Automatic Speech Recognition Systems", LREC, 2008 pp. 592-598.

Markpong Jongtaveesataporn, Chai Wutiwiwatchai, Koji Iwano and Sadaoki Furui "Thai Broadcast News Corpus Construction and Evaluation", LREC, 2008; 1249-1254.

Hossam Ibrahim, Kareem Darwish and Abdel-Rahim Madany "Automatic Extraction of Textual Elements from News Web Pages", LREC, 2008 pp. 1600-1603.

Ingunn Amdal, Ole Morten Strand, Jørn Almberg and Torbjørn Svendsen "RUNDKAST: an Annotated Norwegian Broadcast News Speech Corpus", I Amdal, OM Strand, J Almberg, T Svendsen—LREC, 2008;pp. 1907-1913.

* cited by examiner

*Primary Examiner* — Michael N Opsasnick
(74) *Attorney, Agent, or Firm* — Merchant & Gould P.C.

(57) ABSTRACT

A speech corpus creation method and system are disclosed. The method comprising identifying a publicly accessible first source of the first speech data and its corresponding first text transcription; extracting a second speech data of an accessible encoding format from the first speech data; extracting a second text transcription data with at least one encoding format from the first text transcription data; matching and aligning the transcription to the extracted second speech data at a sentence, word, phoneme level, or combination thereof to form a first and a second speech corpus; analyzing the text transcriptions in the second speech corpus to identify the short speech segments to produce a phonetically balanced, segmented, text aligned third speech corpus; and conditioning the third speech corpus by inserting a context and associated environment richer corpus therein the third speech corpus from at least one second source to form the final speech corpus.

9 Claims, 6 Drawing Sheets

Language Model Corpus

<SIL> THE NINE POINT ZERO MAGNITUDE EARTHQUAKE AND TSUNAMI THAT FOLLOWED ARE BELIEVED TO HAVE KILLED AS MANY AS TWENTY FIVE THOUSAND PEOPLE <SIL> HUNDREDS OF MILES OF COASTLINE HAVE BEEN DESTROYED AND THE COUNTRY'S FISHING INDUSTRY DEVASTATED <SIL> SINCE THE CRUSH OF WATER FLOODED THE PLANT AND KNOCKED OUT COOLING SYSTEMS WORKERS THERE HAVE BEEN DESPERATELY TRYING TO COOL ERHEATED REACTORS <SIL> THE EFFORT HAS REQUIRED SPRAYING LARGE AMOUNTS OF WATER AND ALLOWING IT TO GUSH OUT WHEREVER IT CAN ESCAPE SOMETIMES INTO THE SEA <SIL> WHILE OFFICIALS HAVE SAID THE CRACK IN A MAINTENANCE PIT PLUGGED EARLY WEDNESDAY WAS THE ONLY ONE FOUND THEY HAVE NOT RULED OUT THAT RADIOACTIVE WATER IS LEAKING INTO THE SEA FROM ANOTHER POINT <SIL>

Lexicon

| | |
|---|---|
| DESTROYED | D IH S T R OY D |
| EARTHQUAKE | ER TH K W EY K |
| MAGNITUDE | M AE G N AH T UW D |
| RADIOACTIVE | R EY D IY OW AE K T IH V |
| REACTORS | R IY AE K T ER Z |
| TSUNAMI | S UW N AA M IY |
| ⋮ | ⋮ |

FIGURE 1 (PRIOR ART)

METHOD AND SYSTEM FOR CREATING FRUGAL SPEECH CORPUS USING INTERNET RESOURCES AND CONVENTIONAL SPEECH CORPUS

This application claims benefit of Serial No. 2148/MUM/2012, filed 28 Jul. 2011 in India and which application is incorporated herein by reference. To the extent appropriate, a claim of priority is made to the above disclosed application.

FIELD OF THE INVENTION

The present invention relates to the field of speech technology and linguistics. More particularly the invention relates to a frugal method and system for creating speech corpora which are often (a) used to build acoustic models for use in speech recognition engines and (b) used to do research into Phonetic, Conversation analysis, Dialectology in linguistics.

BACKGROUND OF THE INVENTION

Speech Recognition systems are used in several applications often rely on the use of automatic speech recognition (ASR). Examples of systems that rely on automatic speech recognition output are Automatic Speech-to-Text transcription, Speech-to-Speech translation, Topic Detection and Tracking, etc. Speech recognizers use recorded or live speech as input and attempt to generate a transcript of the spoken speech in the form of text. Such recorded speech data is available on the web, especially in the form of news which is accompanied by the transcripts. Though certain attempts in the past have been made to access and develop a well transcribed speech corpus, however, there are certain limitations to this process including (a) limited speaker variability (number of speakers), (b) limited environment (recording environment) and (c) limited domain.

Hence, it's difficult to create a phonetically balanced corpus from already available data on the web, and provide reasonable variability in terms of environment, gender, age and accent.

A speech recognizer in general constitutes a pattern recognition program and some reference models. These reference models are generated using a language specific speech corpus.

There are two primary types of reference models, (i) the acoustic model and (ii) the language model. The acoustic models may contain a set of models to represent the various sounds, or models representing complete words; these are built using the speech that has various sounds. The acoustic model is assisted by a lexicon which contains the phonetic transcription of the domain and dictionary words. The language models aid in determining the occurrence of words and sequence of words in speech, by applying known patterns of occurrence of said words. The language models could be generated using a text corpus representing the actual spoken speech to be recognized.

FIG. 1 is a prior art illustrating a sample lexicon and text corpus for language model. A speech corpus is required in order to generate acoustic models. A typical speech corpus is a set of speech files and its associated transcriptions. Availability of a speech corpus for a specific language is an essential requirement to build a speech recognition engine and speech recognition based solutions thereof in the respective language. The process of creating a speech corpus in any language is a laborious, expensive and time consuming process. The usual process of speech corpus creation starts with a linguist determining the language specific idiosyncrasies and then a textual corpus is built to take care of the uniform distribution of the phonemes in the language (also called phonetically balanced corpus). Subsequently a target speaker age, accent and gender distribution is computed leading to the recruitment phase where the speakers are recruited.

The actual speech recording is then undertaken from the recruited speakers, in predetermined environments. Typically, the text corpus is created by keeping the underlying domain in mind for which the speech recognition is going to be used. For spontaneous conversational speech like Telephone calls and Meetings, the process of speech corpus creation may start directly from the speaker recruitment phase. Once the speech data is collected, the speech is carefully heard by a human who is a native speaker of said language and transcribed manually.

The complete set of the speech data and the corresponding transcription together forms the speech corpus. This is quite an elaborate process, which means several languages do not have a speech corpus available especially when the languages do not have commercial speech recognition based solution viability.

Thus there exists a long felt need for an effortless and inexpensive method and system that enables creation of a speech corpus.

OBJECTS OF THE INVENTION

The primary object of the invention is to provide a frugal method to create a speech corpus that enables minimization of effort and expense.

Another object of the invention is to provide a system that enables the use of publicly available speech data and its transcription on the web to create a speech corpus.

Yet another object of the invention is to provide a system that enables creation of a speech corpus using a balanced combination of publicly available speech data with transcription and additional speech corpus collected as per conventional method.

Yet another object of the invention is to provide a system that aligns long speech segments with the corresponding extracted text transcription and associates environment richer corpus.

SUMMARY OF THE INVENTION

The system of the present invention uses readily available speech data and its corresponding text transcription on the internet. The system extracts the said data in an encoded format which is subsequently stored in a database. A speech alignment system matches the transcription to the speech file at the sentence and word level. The transcripts are then analyzed by the phonetically balanced data extractor to identify those text segments that would satisfy the phonetic balancing of the speech corpus in the given language. It extracts the speech data corresponding to these said text segments. The phonetically balanced text segments and the corresponding speech segments together form the speech corpus.

In one aspect of the invention, the long speech alignment mechanism detects and indexes syllables in the text transcription data by employing a text syllable annotator. Subsequently, it annotates and indexes each detected syllable in the speech data. Further, it aligns the syllable annotated speech data with the syllable annotated text data by matching the corresponding syllable indexes, to form a first syllable aligned speech corpus.

In another aspect of the invention, the aligning mechanism aligns short speech segment with the corresponding extracted text transcription to form a segmented text aligned second speech corpus at sentence, word and phoneme level.

In another aspect of the invention, the text transcription are analyzed in the speech corpus to identify the short speech segments which together form a phonetically balanced, segmented, text aligned speech corpus which is known as third speech corpus. Subsequently, a compensator is employed for inserting a context and associated environment richer corpus into the third speech corpus to produce a final corpus.

BRIEF DESCRIPTION OF ACCOMPANYING DRAWINGS

The foregoing summary, as well as the following detailed description of preferred embodiments, will be better understood when read in conjunction with the appended drawings. For the purpose of illustrating the invention, there is shown in the drawings exemplary constructions of the invention; however, the invention is not limited to the specific method, system and architecture disclosed in the drawings:

FIG. 1 (prior art) illustrates a diagram depicting the sample lexicon and language model text corpus;

DETAILED DESCRIPTION OF THE INVENTION

Some embodiments of this invention, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an" and "the" include plural references unless the context clearly dictates otherwise.

Although any methods, and systems similar or equivalent to those described herein can be used in the practice or testing of embodiments of the present invention, the preferred methods, and systems are now described.

The disclosed embodiments are merely exemplary for the invention, which may be embodied in various forms.

Now, by way of drawings, there is disclosed the frugal method for creation of speech corpus, the accompanying drawings do not limit the scope and ambit of the invention and are provided purely by way of examples.

Figure 2:
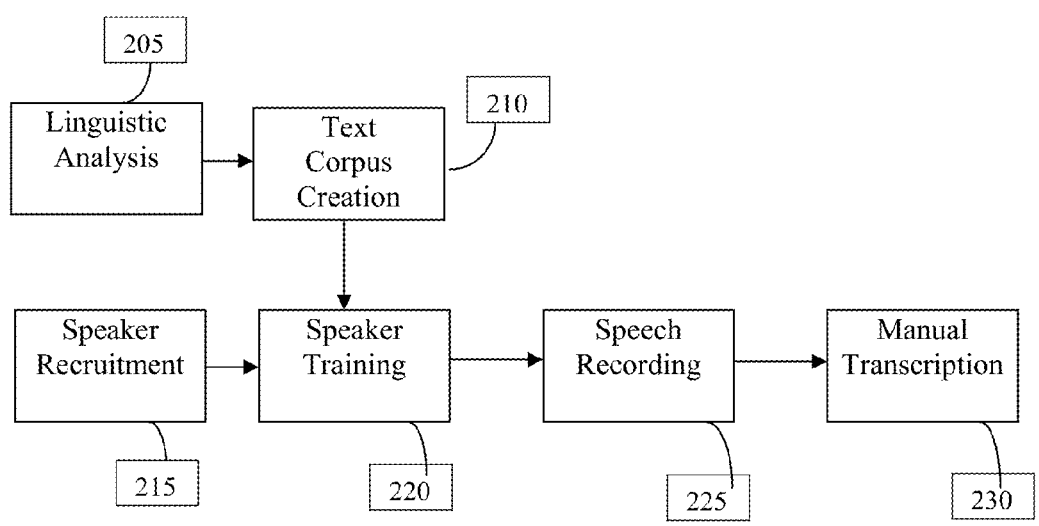
FIG. 2 (prior art) illustrates a block diagram for a typical method for creation of speech corpus.

Referring to the FIG. 2 (prior art) is a block diagram depicting a typical and currently used method of speech corpus creation. As shown in the figure the speech corpus creation involves the following steps:

The linguist does an analysis (205) and determines the language specific idiosyncrasies.

Then a textual corpus is built (210) such that it is phonetically balanced. Typically, the text corpus is created keeping in mind the underlying domain for which the speech recognition is going to be used.

The target speakers are recruited (215) and registered. The number and type of speakers (native, non-native; in terms of region and language) are chosen to capture speaker variability and is also based on the goal of the corpus creation.

The target speakers are given guidelines and trained (220) for speaking the text corpus and in the predetermined environment. The predetermined environment defines parameters like the recording device and channel viz. telephone, desktop, web, etc. The recording environment may have changes like use of multiple recording devices of the same type, or recording at different times of the day (or week). This is mainly done to capture variability in recording environment.

Then the actual speech recording (225) is carried out by asking the recruited speakers to speak.

The collected speech data is then manually transcribed (230) and verified, by a human after carefully listening to the speech recordings.

For spontaneous conversational speech like telephone calls and Meetings, the process of speech corpus creation may start directly from the recruitment phase. As evident this process is lengthy, consumes lot of efforts and is costly.

In a preferred embodiment, the present invention achieves the objective of providing a frugal method of creation of speech corpus, by using readily available speech data on the internet as a part of the complete speech corpus. Speech data is available on the internet, (especially in the form of audio and video, for e.g. news videos at the news channel websites etc.) in different languages. This data is generally accompanied by the transcripts in that language. In this way one may have access to a well transcribed speech corpus.

However, there are certain limitation in terms of (a) limited speaker variability (number of speakers), (b) limited environment (recording environment) and (c) limited domain.

Figure 3:
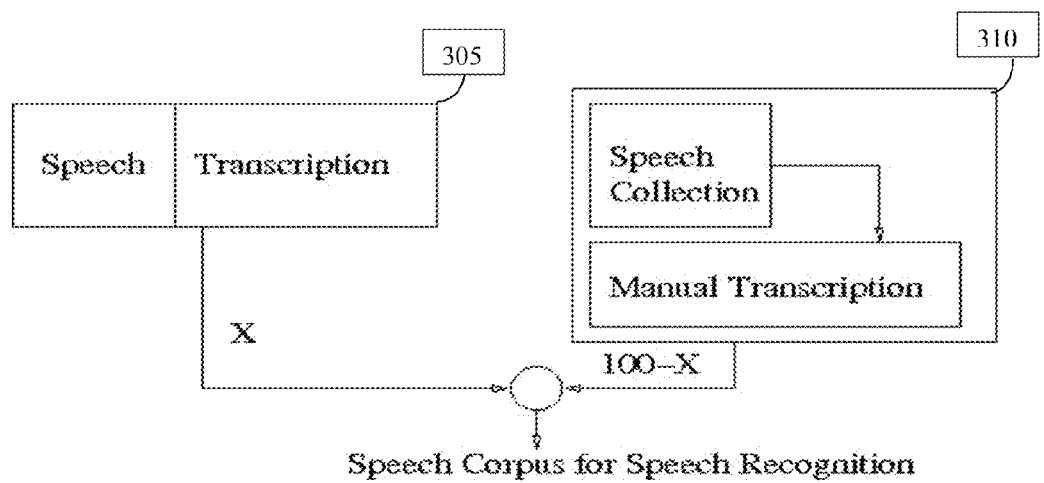
FIG. 3 illustrates a block diagram embodying one embodiment of the method of the invention.

The method of the present invention banks on such data already available in public domain. It creates the phonetic balance of the corpus and then collects minimal data to get variability in terms of environment, gender, age and accent. The combination of available speech data and the smaller amount of collected data enables construction of a speech corpus for a given language in a frugal way which is illustrated in the FIG. 3. For example, a portion, say X % of the speech corresponding to the collected text comes from the speech data from the website itself and the remaining (100−X) % could be collected in the usual way. The choice of X would determine the amount of effort, time and expenditure in constructing the speech corpus. The larger the X the more frugal method for the construction of the speech corpus is considered. In the limiting case, when X=0, it would be what is conventionally used for speech corpus creation. In an opposite scenario, if X=100, it would be the cheapest mode of creation of speech corpus at the cost of lack of diversity in terms of speaker variability and environment. X could be controlled based on the use of the speech recognition engine. The left hand side (305) of the FIG. 3 depicts the use of already available resources on the web and the right hand side (310) of the FIG. 3 depicts the conventional speech data collection process. The factor X determines the amount of deviation from the conventional approach in terms of making it frugal.

Figure 4:
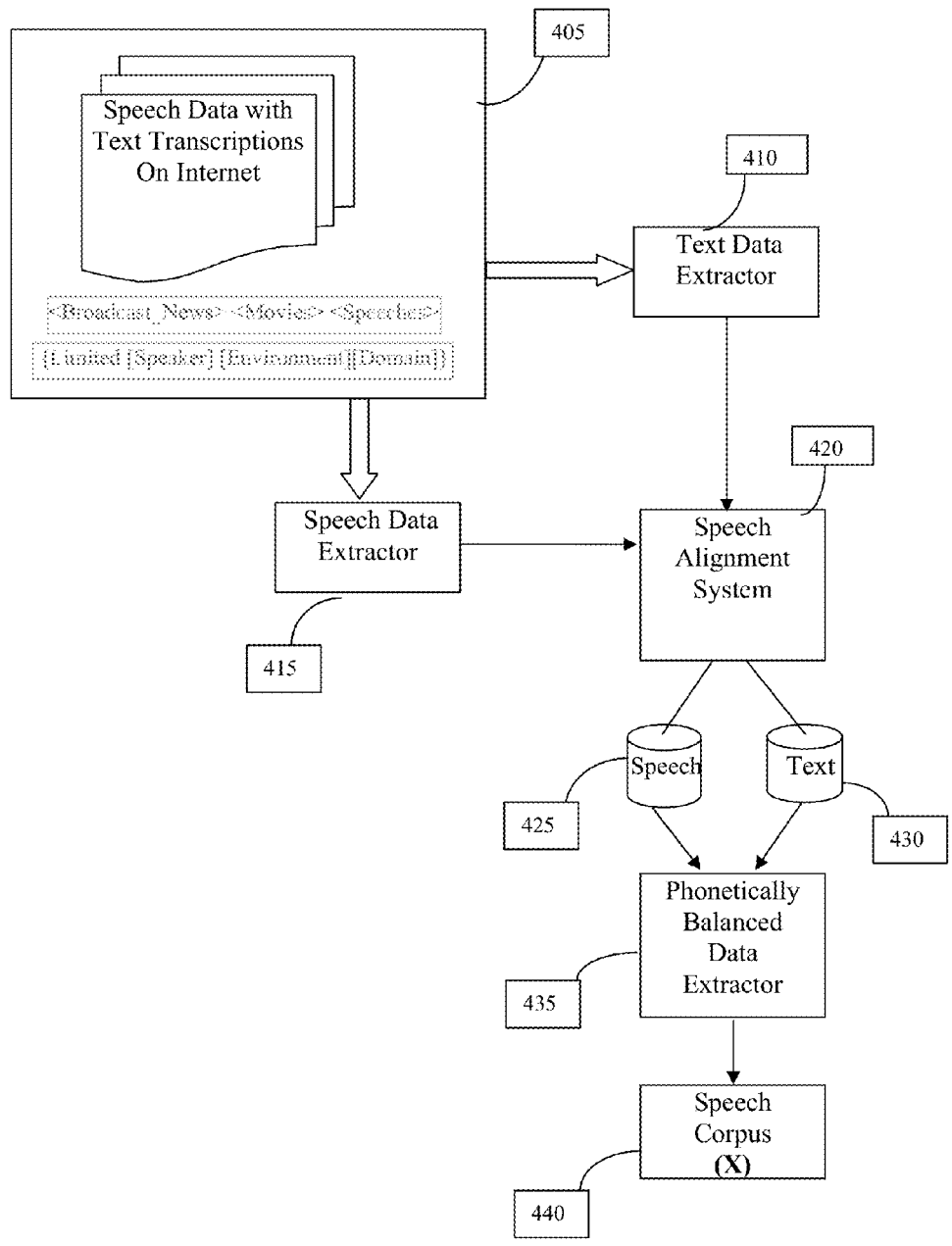
FIG. 4 illustrates a block diagram embodying another embodiment of the method of invention.

Referring to FIG. 4 is a block diagram illustrating an embodiment of the invention. The scenario illustrated in FIG.

4 considers that the system creates a speech corpus for a language. The user/human needs to identify sources on the internet which allow public access to speech data in said language. The speech data extractor (415) downloads the speech data from the first source in its original format (405) and converts the speech data into a format usable by the speech alignment system (420). The text data extractor (410) downloads the transcription in its original format, extracts the given language textual content and converts it into the standard Unicode text encoding format. The Unicode encoded text can be easily represented displayed and processed. A speech alignment system (420) matches the transcription to the speech file at a sentence, word, phoneme level or combination thereof. Upon alignment the first speech and text data of a long speech is disintegrated into a short segmented speech (425) and a short segmented text transcription (430).

These segmented speech and text transcripts are then analyzed by the phonetically balanced data extractor (435) to identify those text segments that would satisfy the phonetic balancing of the speech corpus in the given language. It extracts the speech data corresponding to these text segments. The phonetically balanced text segments and the corresponding speech segments together form a third speech corpus (440).

In yet another embodiment of the invention, the system comprises a speech alignment module enabled to align the transcription to the speech file at the sentence and word level. Though such task is simple for small speech segments, however, the speech data available on internet is in the form of news, movies, speeches, audio books etc which is of longer durations and hence the alignment task gets complicated. The existing systems for speech alignment use two general techniques (a) manual segmentation into smaller speech segments followed by alignment of small speech segments using Speech Recognition techniques (b) Speech to Text conversion of long speech followed by text alignment and correction.

Accordingly, the system of the present invention proposes a new technique for speech alignment of long speech files. A matching and aligning module of the present invention performs following incremental process steps:

it detects plurality of syllables in the second speech data and in the second text transcription data by employing a text syllable annotator. Further it incrementally annotates and indexes each detected syllable in the second speech data and in the second text transcription data followed by alignment of the syllable annotated second speech data with the syllable annotated second text data by matching the corresponding syllable indexes, to form a first syllable aligned speech corpus.

Thus aligned first speech corpus is segmented into plurality of short speech segments of uniform length and subsequently aligning each short segment with the corresponding exacted text transcription to form a segmented text aligned second speech corpus, featuring alignment at sentence, word or phoneme level.

Figure 5:
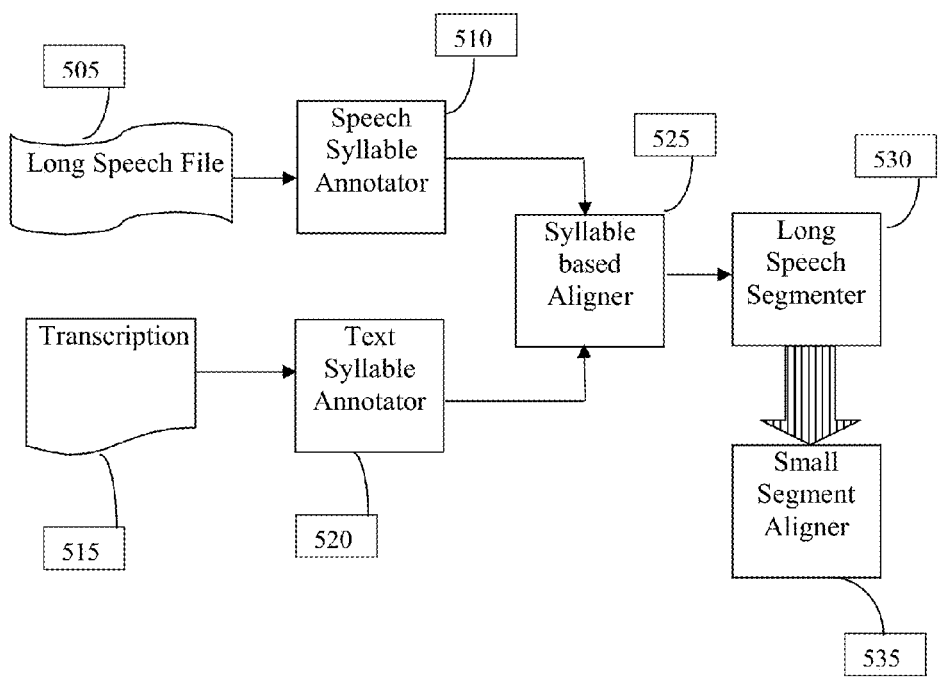
FIG. 5 illustrates a block diagram depicting an embodiment of the invention for alignment of long speech data to text transcription.
Figure 6:
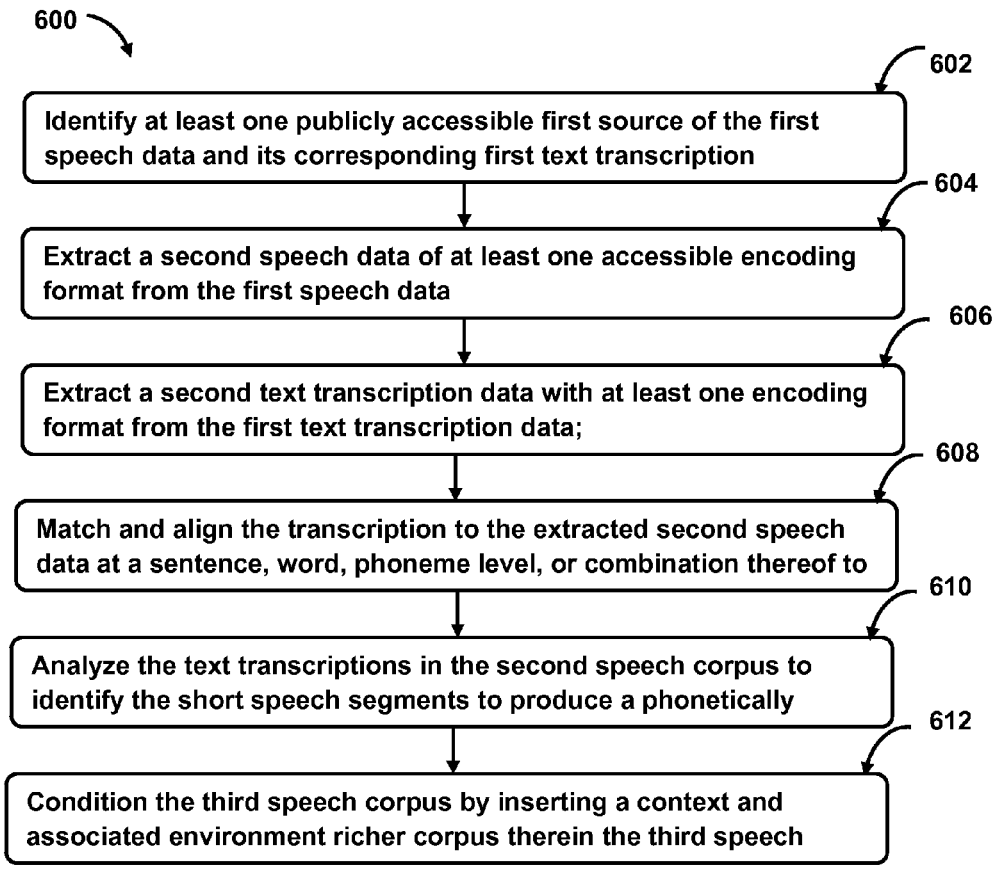
FIG. 6 illustrates a block diagram depicting an embodiment of the invention including conditioning the third speech corpus by inserting context and associated environment richer corpus.

According to one embodiment of the invention, the FIG. 5 a block diagram depicts a sequential method for alignment of long speech data to text transcription. As shown in the figure, the speech syllable annotator (510) detects the syllables and marks the syllables in the long speech file (505). Similarly, the text syllable annotator (520) marks the syllables in the transcription (515). Further, the syllable based aligner (525) aligns the speech and text based on the syllable indexes. The syllable aligned long speech file is then segmented into smaller segments along with their corresponding transcription segments. Each of these small speech segments are aligned using Speech Recognition techniques.

BEST MODE/EXAMPLE OF WORKING OF THE INVENTION

The following description and associated figures teach the best mode of carrying out the invention. For the purpose of teaching inventive aspects, some conventional aspects of the best mode may be simplified or omitted therefore the invention disclosed by way of best mode should not be construed to limit the scope of the invention.

Consider a scenario where a speech enabled application is to be built for querying information on commodity market prices, in Marathi language. For instance, a user would speak a query to the system, like "What is the price of wheat in the market", in the Marathi language, and the system would reply with the required information. In order to create models for speech recognition in Marathi language for this application, a Marathi speech corpus is required. The conventional method to build the speech corpus would be lengthy, time consuming and costlier, as discussed. Instead a frugal speech corpus creation method, as provided by the present invention, can be used as follows:

The internet is manually searched for Marathi speech data along with transcription. It is found to be available in the form of audio-text news pair on the website http://www.newsonair.com/language-bulletins-archive-search.asp.

The Marathi audio news and its corresponding text news are downloaded from this news website. The audio news forms the first speech data and the text news forms the corresponding first text transcription.

Since the audio news (first speech) is in compressed MP3 audio format, it is converted into PCM WAVE format. This forms the second speech data.

Similarly the text news (first text transcription) is in PDF format. It is converted into machine readable text files. This forms the second text transcription data.

The second speech data consists of audio news programme of considerably long duration. These long speech files are aligned with the corresponding text transcriptions by the speech alignment system as follows:

It detects the syllables in the second speech data files using a speech syllable detection algorithm and indexes the syllables incrementally.

It detects the syllables in the second transcription data using a text syllable annotator and indexes the syllables incrementally.

It matches the speech and text syllable indexes to form a first syllable aligned Marathi speech corpus It segments the first aligned speech corpus into short speech segments of uniform length.

The short speech segments are then aligned to the text transcription using automatic speech recognition method to form a segmented text aligned second speech corpus, featuring alignment at atleast sentence, word and phoneme level.

The text transcriptions of the short speech segments are analyzed to identify the set of segments which together form a phonetically balanced, segmented, text aligned third speech corpus.

The application will answer queries on prices of commodities in different markets, the phonetically balanced third speech corpus, based on news spoken by only few news speakers, may not be enough to address the speaker variability that will be encountered by the application. Similarly the corpus would require instances of certain application domain words that do not appear in the corpus. To address this deficiency minimal Marathi language speech data for the application is additionally collected using the conventional technique. The text transcription for this data is designed so as to address the above deficiency.

The combination of the phonetically balanced, segmented, text aligned third speech corpus and the minimal collected speech data together form the Marathi language speech corpus.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein. Moreover the methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A speech corpus creation method, implementing extraction of a first speech data from at least one first source and mixing with at least one second source, the method comprising processor implemented steps of:
   identifying at least one publicly accessible first source of the first speech data and its corresponding first text transcription;
   extracting a second speech data of at least one accessible encoding format from the first speech data;
   extracting a second text transcription data with at least one encoding format from the first text transcription data;
   matching and aligning the transcription to the extracted second speech data at a sentence, word, phoneme level, or combination thereof to form a first and a second speech corpus;
   analyzing the text transcriptions in the second speech corpus to identify the short speech segments to produce a phonetically balanced, segmented, text aligned third speech corpus; and
   conditioning the third speech corpus by inserting a context and associated environment richer corpus therein the third speech corpus from at least one second source to form the final speech corpus.

2. A method as claimed in claim 1, wherein speech data extractor engine extracts the first speech data along with transcription thereof from publicly accessible sources that are relevant to a desired corpus.

3. A method as claimed in claim 1, wherein while aligning the speech, a two stage alignment process is carried out comprising a first level syllable matching adapted to match the extracted transcription to the corresponding extracted long speech data at a syllable level and a subsequent second level matching adapted to align, using automatic speech recognition engine, short speech segments of the long syllable aligned speech data at sentence, word or phoneme level.

4. A method as claimed in claim 1, wherein the matching and aligning comprising steps of:
   detecting plurality of syllables in the second speech data;
   detecting plurality of syllables in the second text transcription data by employing a text syllable annotator;
   annotating and indexing each detected syllable in the second speech data and in the second text transcription data;
   aligning the syllable annotated second speech data with the syllable annotated second text data by matching the corresponding syllable indexes, to form a first syllable aligned speech corpus;
   segmenting the said first aligned corpus into plurality of short speech segments of uniform length; and
   aligning each short segment with the corresponding exacted text transcription to form a segmented text aligned second speech corpus, featuring alignment at sentence, word or phoneme level.

5. A method as claimed in claim 1, wherein the third speech corpus, derived from a public source of speech data and its transcription, is conditioned with a context and associated environment richer corpus, collected using traditional procedure, to form the final speech corpus.

6. A speech corpus creation system, implementing extraction of a first speech data from at least one first source and mixing with at least one second source, the system comprising:
   a speech data extractor adapted to extract a second speech data of at least one encoding format from the first speech data;
   a text data extractor adapted to extract a second text transcription data of at least one encoding format from a first text transcription of the first speech data;
   a speech alignment module adapted to match and align the first text transcription to the corresponding extracted long speech data in the first speech data, at a sentence word level, or combination thereof to form a first and a second speech corpus;
   a phonetically balanced data extractor for analyzing the text transcriptions in the second speech corpus and to identify the short speech segments to form a phonetically balanced, segmented, text aligned third speech corpus; and
   a compensator means adapted to identify at least one contextual gap in the third speech corpus and to condition the third speech corpus by inserting a context and associated environment richer corpus therein the third speech corpus from the at least one second source to form a final speech corpus.

7. A system as claimed in claim 6, wherein speech data extractor engine extracts the first speech data along with transcription thereof from publicly accessible sources that are relevant to a desired corpus domain.

8. A system as claimed in claim 6, wherein while aligning the speech, a two stage alignment is carried out comprising a first level syllable matching adapted to match the extracted transcription to the corresponding extracted long speech data at a syllable level and a subsequent second level of matching adapted to align, using automatic speech recognition, short speech segments of the syllable aligned long speech data, at least sentence, word and phoneme level.

9. A system as claimed in claim 6, wherein the speech alignment module comprising of:
- a speech syllable annotator adapted to annotate and index plurality of syllables in the second speech data;
- a text syllable annotator adapted to annotate and index the syllables in the second text transcription data;
- a syllable based aligner adapted to align the syllable indexed second speech data to the syllable indexed second text data by matching syllable indexes, to form a first syllable aligned long speech corpus, a long speech Segmenter adapted to segment the first syllable aligned long speech corpus into plurality of uniform segments; and
- a short speech aligner adapted to align each short speech segment at least sentence, word and phoneme level with the corresponding transcription using an automatic speech recognition engine to form a segmented text aligned second speech corpus.

* * * * *